United States Patent [19]

Rosenfeld

[11] Patent Number: 4,647,193
[45] Date of Patent: Mar. 3, 1987

[54] OPTICAL TARGET RANGING APPARATUS

[75] Inventor: Jerome P. Rosenfeld, Camden County, N.J.

[73] Assignee: RCA Corporation, Princeton, N.J.

[21] Appl. No.: 742,852

[22] Filed: Jun. 10, 1985

[51] Int. Cl.⁴ .............................................. G01C 3/08
[52] U.S. Cl. ......................................... 356/4; 356/375
[58] Field of Search .................. 356/4, 5, 1, 375, 376, 356/384; 250/211 R

[56] References Cited

U.S. PATENT DOCUMENTS

| 3,954,340 | 5/1976 | Blomqvist et al. | 356/152 |
| 4,340,302 | 7/1985 | Oku | 356/241 |
| 4,367,027 | 1/1983 | Stauffer | 354/195 |
| 4,411,528 | 10/1983 | Newcomb et al. | 356/375 |
| 4,427,880 | 1/1984 | Kanade et al. | 356/376 X |
| 4,477,168 | 10/1984 | Hosoe | 354/403 |

OTHER PUBLICATIONS

Honeywell Visitronic Measurement Systems, HDS-23 Instruction Manual Revision B, May 1984.

Primary Examiner—L. T. Hix
Assistant Examiner—D. Rutledge
Attorney, Agent, or Firm—J. S. Tripoli; R. L. Troike; C. L. Maginniss

[57] ABSTRACT

The range of a target is determined by imaging an illuminated spot on the target onto a detector surface by a focusing lens. The detector is positioned away from the focal point of the image of the illuminated spot, so that the image appears as a blurred circle. The range of the target is uniquely determined by the diameter of the blurred circle. In one embodiment the detector surface comprises a relatively large area having a narrow central area within two parallel boundaries equally spaced from a line representing the locus of the centers of the images on the detector surface. The diameter of the blurred circle can be determined by comparing the light energy received in the narrow central area of the detector with the total light energy received by the detector.

19 Claims, 5 Drawing Figures

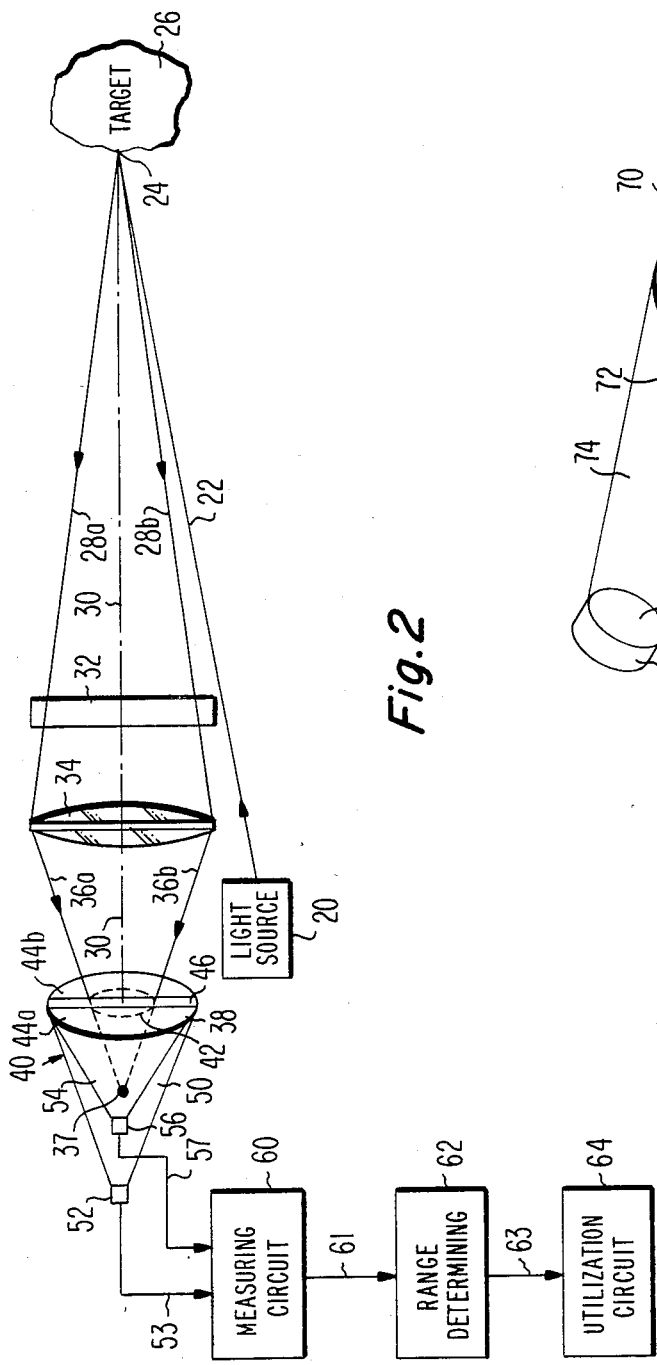
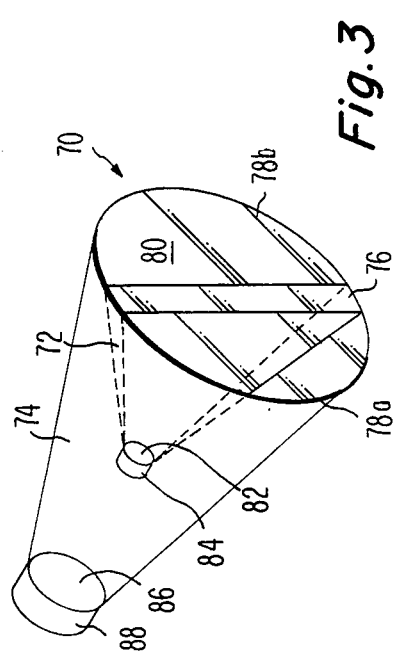

OPTICAL TARGET RANGING APPARATUS

The Government has rights in this invention pursuant to Contract No. 104230-84-D-0929 awarded by the United States Postal Service.

The present invention relates generally to range finders and, more particularly, to an apparatus for determining the range of an object by determining the diameter of an unfocused circle imaged by a lens on a detector surface.

BACKGROUND OF THE INVENTION

In the field of robotic object manipulation as, for example, in a parcel handling system of a post office distribution center, there is the need to be constantly aware of the distance between a manipulating arm and the object to be moved. A target ranging apparatus for use in such a system would ideally be compact, lightweight, inexpensive, yet reliable and accurate to within a few millimeters, over a span of distances from several centimeters to a few meters.

In general, there are two techniques in widespread use for target ranging. The first technique involves assailing the target with radiant energy, as with a pulsed or chirped laser beam, or with acoustic energy, detecting the signal reflected from the target, and comparing the relative phases of the transmitted and received optical or acoustic signals. Such a system is disclosed in U.S. Pat. No. 3,954,340, "METHOD OF AND APPARATUS FOR TARGET TRACKING," issued May 4, 1976, to A. H. P. Blomquist et al. This form of target ranging tends to be too complex and expensive for the type of system contemplated.

The second technique involves a triangulation measuring scheme, in which light from a source is reflected by the target to a position on a detector, and the distance to the target is reckoned by the length of the baseline between the source and the reflected target image at the detector. This technique is widely used and is the range finding scheme disclosed in U.S. Pat. No. 4,340,302, "ENDOSCOPE WITH SENSOR," issued July 20, 1982, to T. Oku, and in U.S. Pat. No. 4,477,108, "RANGE FINDER," issued Oct. 16, 1984, to K. Hosoe.

Both of these techniques require a priori knowledge relating to the source of illumination. In the first instance, the phase of the transmitted signal must be known for comparison with the phase of the received signal. In the second instance, the position of the transmitted illuminating signal must be known since the computed distance to the target is a direct function of the difference between the positions of the illuminating source and the received image.

The present invention employs neither of these techniques; rather, it makes use of the fact that a location on a target object, when illuminated by a narrow beam of light, will act as a point source of light radiation, and that this point source, when imaged by a lens onto a plane detector surface located away from the focal point of the source, forms a blurred circle whose diameter can be directly related to the distance between the lens and the point source. Thus, the range of the object reflecting the light radiation can be determined solely by measuring the diameter of the blurred circle, which is independent of the positions of the illuminating source and the position of the image on the detector.

SUMMARY OF THE INVENTION

In accordance with the principles of the present invention, an apparatus is disclosed for use in optical target ranging. The apparatus is responsive to light radiation reflected from a target and includes a light-sensitive detector having a planar light receiving surface. The apparatus also includes an optical system responsive to the light radiation for producing an unfocused, generally circular image of the reflected light on the planar surface. The apparatus further includes means for measuring the diameter of the unfocused image on the detector planar surface. Finally, the apparatus includes means coupled to the measuring means and responsive to the measured diameter for determining the range of the target.

BRIEF DESCRIPTION OF THE DRAWINGS

FIG. 2 illustrates an optical target ranging apparatus according to one embodiment of the present invention;

FIG. 3 illustrates a light-sensitive detector which may be used in the apparatus of FIG. 2;

DETAILED DESCRIPTION OF THE PREFERRED EMBODIMENTS

Figure 1:
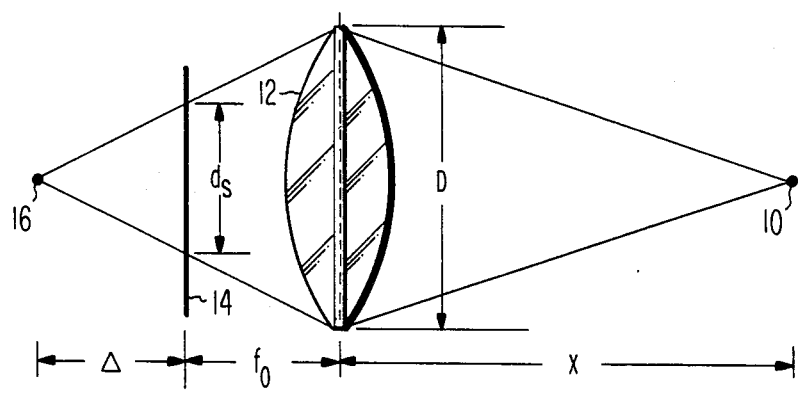
FIG. 1 is a plane geometrical construction useful in understanding the physical and optical relationships relied on by the present invention.

Referring to FIG. 1, there is shown a plane geometrical representation including point source 10, lens 12, plane detector surface 14, and focal point 16 of source 10. In this representation, x is the distance between point source 10 and lens 12, $f_o$ is the distance between lens 12 and detector surface 14, $\Delta$ is the distance between detector surface 14 and focal point 16, lens 12 has diameter D and focal length f, and the blurred image of point source 10 has a diameter on detector surface 14 of $d_s$.

Considering lens 12 to be a thin lens, i.e., the distance between its boundary surfaces is small compared with its radii of curvature, the following relationship exists among its focal length f, the distance to an object x, and the distance to the focal point of the imaged object $f_o + \Delta$):

$$1/f = 1/x + 1/(f_o + \Delta). \tag{1}$$

Recognizing that $d_s$ and D are bases of similar triangles having altitudes of $\Delta$ and $(f_o + \Delta)$, respectively, Equation (1) can be manipulated so that x can be expressed in the following way:

$$x = Df_o / \{d_s + D[(f_o/f) - 1]\}. \tag{2}$$

It is thus seen that for a fixed distance $f_o$ between lens 12 and detector surface 14, there is a unique inverse relationship between the target distance x and the diameter $d_s$ of the blurred circle on detector surface 14.

Referring to FIG. 2, there is illustrated an optical target ranging apparatus according to one embodiment of the present invention. Light source 20, which may typically be a laser, emits a narrow, collimated light beam 22 such that it illuminates a small spot 24 on target object 26. It is important that spot 24 be small so that the optical system perceiving the light reflected therefrom may treat it as a point source.

The light reflected from illuminated spot 24, shown as rays 28a and 28b centered about optical axis 30, is directed onto filter 32 which is selected to pass only those wavelengths close to the emitting source 20, and thereby limit the amount of background light reaching detector 40. If source 20 is a laser emitting monochromatic light, filter 32 may have a narrow passband and therefore be very effective in eliminating ambient light.

The light 36a,b passing through filter 32 which strikes convex lens 34 is deflected toward a focal point 37. The deflected light 36a,b is imaged on a planar surface 38 of detector 40 where it forms a blurred illuminated circle 42. Planar surface 38 is positioned away from the point 37 where the light reflected from spot 24 would be focused by lens 34, thereby providing blurred circle 42 having a finite measurable diameter.

Detector 40, which is of a type to be described in greater detail in an ensuing paragraph, includes light-funneling devices 50 and 54 and photodetectors 52 and 56. Light funnel device 50 has a light-receiving area 46 and light funnel device 54 has two light-receiving areas 44a and 44b; areas 44a, 44b and 46 are aligned so as to form a planar surface 38, positioned normal to optical axis 30. As shown, surface 38 is generally circular, including generally semicircular areas 44a and 44b located symmetrically on either side of narrow slit area 46.

The light striking narrow slit area 46 is steered by light funnel device 50 to photodetector 52, which provides an electrical signal on lead 53 to measuring device 60 indicative of the light energy impinging on area 46. In a similar manner, the light striking surrounding areas 44a and 44b is steered by light funnel device 54 to photodetector 56, which provides an electrical signal on lead 57 to measuring device 60 indicative of the light energy impinging on areas 44a and 44b.

Figure 4:
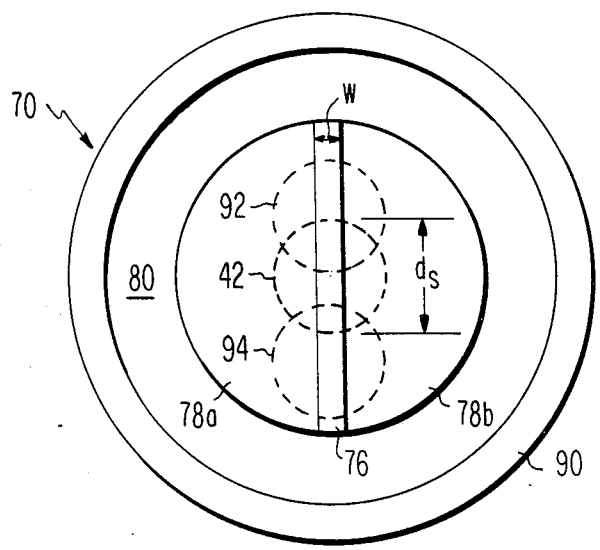
FIG. 4 is a light-receiving view of the planar light-receiving surface of the detector of FIG. 3.

Measuring device 60 utilizes the electrical signal representations of the light energy received at surfaces 46 and 44a,b to determine the diameter of blurred circular image 42, according to a method to be described in relation to the discussion of FIG. 4. Range determining circuit 62 utilizes the electrical signal on lead 61 indicative of the diameter of the blurred circle 42 to determine the range of target object 26, according to either of two methods to be described later. Finally, an electrical signal on lead 63, indicative of the range of object 26, is provided to circuit 64 which utilizes the range information.

Referring to FIG. 3, there is illustrated an embodiment of a light detector 70 which may be used as detector 40 in the apparatus of FIG. 2. Detector 70 includes conically shaped, light-funneling device 74 which may be, for example, a light pipe. Detector 70 further includes a narrow-width, flared horn, light-funneling device 72 which may also be a light pipe; device 72 is embedded within device 74 as shown.

Light pipes 72 and 74 include light-receiving areas 76, 78a and 78b, which are aligned so as to form a planar light-receiving surface 80. Light incident on light-receiving area 76 travels along narrow-width light pipe 72, reflecting internally whenever it strikes a boundary wall, until it reaches output aperture 82. The light emerging from aperture 82 is coupled into photodetector 84 which provides an electrical signal indicative of the light energy impinging on light-receiving area 76.

Similarly, light incident on light-receiving areas 78a and 78b travels along light pipe 74, reflecting internally whenever it strikes a boundary wall, until it reaches output aperture 86. The light emerging from aperture 86 is coupled into photodetector 88 which provides an electrical signal indicative of the light energy impinging on light-receiving areas 78a and 78b. Photodetectors 84 and 88 may be identical devices and may each comprise a photodiode similar to type C30906E silicon avalanche diode, sold by RCA Solid State Division, Somerville, N.J.

In one embodiment, light pipe 72 is an air-filled, horn-shaped light guide with a narrow, generally rectangular cross section, having an open end for receiving light energy therein. Light pipe 72 is symmetrically positioned within light pipe 74, which is an air-filled, horn-shaped light guide having a generally circular cross section, and an open end for receiving light energy therein. All internal boundary walls of both light pipes 72 and 74 are mirrored so as to inwardly reflect light received in their open ends. The tapered configurations of light pipes 72 and 74 ensure that all internal light reflections will strike the mirrored boundary walls at less than a 90° angle, and will therefore continue inwardly to output apertures 82 and 86, respectively.

In a second embodiment, light pipes 72 and 74 are made of an acrylic or polycarbonate sheet material, such as Lucite, which has a refractive index of 1.50. Light-receiving areas 76 and 78a,b taper generally uniformly to the output apertures 82 and 86, respectively. Both light pipes 72 and 74 include coatings on the tapered walls to prevent leakage of light energy out through the side walls of the pipe. In a light pipe made of a material such as Lucite, light traveling through the pipe will be internally reflected so long as its incident angle with the walls does not exceed a predetermined critical angle, which, in the instant embodiment, is 41.8°. It should also be noted that the tapered configuration of light pipes 72 and 74 produces the result that each successive reflection from a boundary wall will be at a more severe angle.

Referring to FIG. 4, there is shown a light-receiving view of the planar light-receiving surface 80 of detector 70 shown in FIG. 3. Surface 80 includes narrow slit light-receiving area 76 and the large surrounding light-receiving areas 78a and 78b. FIG. 4 additionally shows a remote, ambient light-receiving area 90, not shown as part of FIG. 3. In an embodiment of detector 70 which includes a means for measuring the ambient light passing through filter 32 and lens 34 but not originated from point source 24 (see FIG. 2), remote light-receiving area 90 is coupled by light funneling means (not shown), which may be similar to light pipe 72, a photodetector (not shown), which may be similar to photodetector 84.

FIG. 4 also shows the blurred circle 42 of light reflected from point 24 and imaged by lens 34 (see FIG. 2). Detector 70 is positioned relative to blurred circle 42 such that the center of circle 42 is midway between the parallel lines forming the boundaries of light-receiving area 76, and such that blurred circle 42 falls entirely within light-receiving areas 76, 78a and 78b.

It is known that the total area of illumination from blurred circle 42, including illumination in areas 76, 78a and 78b, is equal to $\pi d_s^2/4$, where $d_s$ is the diameter of blurred circle 42. In addition, where w, the width of narrow slit area 76, is very small relative to $d_s$, it can be said that the area of illumination from blurred circle 42 within narrow slit area 76 is approximately $d_s \cdot w$. Assuming an apparatus in which the effect of ambient light energy can be eliminated from the light-detecting systems coupled to light-receiving areas 76, 78a and 78b, and further assuming that the light intensity on blurred circle 42 is uniform over its area, i.e., it is a circularly symmetrical spot of constant energy density, then it can be said that the total light energy detected by photodetector 84, $E_N$, and by photodetector 88, $E_S$, is a measure of the area of circle 42. Thus, the ratio of the total light energy received by photodetectors 84 and 88, $E_N+E_S$, to the light energy received by photodetector 84, $E_N$, is equivalent to the ratio of the total illuminated area of circle 42 to the area of illumination in area 76, and is mathematically expressed as $$(E_N+E_S)/E_N = d_s \cdot \pi / 4w. \qquad (3)$$

Stated another way, the diameter, $d_s$, of blurred circle 42 is directly proportional to the total light energy received on light-receiving areas 76, 78a and 78b divided by the light energy received on narrow slit area 76.

It may be seen from FIG. 2 that beam 22 from light source 20 is not coincident with the optical axis 30 of lens 34, and that actual coincidence can only be achieved by the use of additional optical elements such as beam splitters, polarizing plates, etc. Since the source beam 22 is displaced from the point of detection, it is easily seen that variations in the range of target 26 will cause a shift in the focal point 37. Whereas this shift is the basis for the ranging determination in those schemes employing triangulation, as mentioned earlier, it is not a desirable phenomenon in the present invention. Nevertheless, the effect of this shift of the imaged spot is eliminated by the proper orientation of narrow slit area 46. Specifically, if narrow slit light-receiving area 46 of surface 38 is positioned so that the locus of the centers of blurred circle 42 is a line midway between the longitudinal boundaries of area 46, then the slight drift of blurred circle 42 due to the variations in the target range has minimal effect on the determination of the diameter of circle 42. FIG. 4 shows blurred circle 42 in a central position and blurred circles 92 and 94 offset from that position, each one of which illuminates the same relative portions of light-receiving areas 76 and 78a,b.

Referring again to FIG. 2, range determining circuit 62 uses information provided by measuring circuit 60 relating to the diameter of the blurred circle 42 imaged on detector 40 to determine the range of target 26. Circuit 62 may, in one embodiment, determine the range, x, purely computationally, using equations (2) and (3), since D, $f_o$, f and w have known values, and $E_N$ and $E_S$ are measurable. Although this method may yield satisfactory results in some applications, there are too many approximations and too many non-linear influences in the parameters for this method to be applied in exacting situations. Nevertheless, range determining circuit 62 can rely on the existence of a unique, monotonic relationship between target range and blur circle diameter. It is therefore recommended that a better embodiment for the range determining circuit, one which is described in conjunction with FIG. 5, is a look-up table which has stored calibrated values of target range, x, for each value of $(E_N+E_S)/E_N$.

Figure 5:
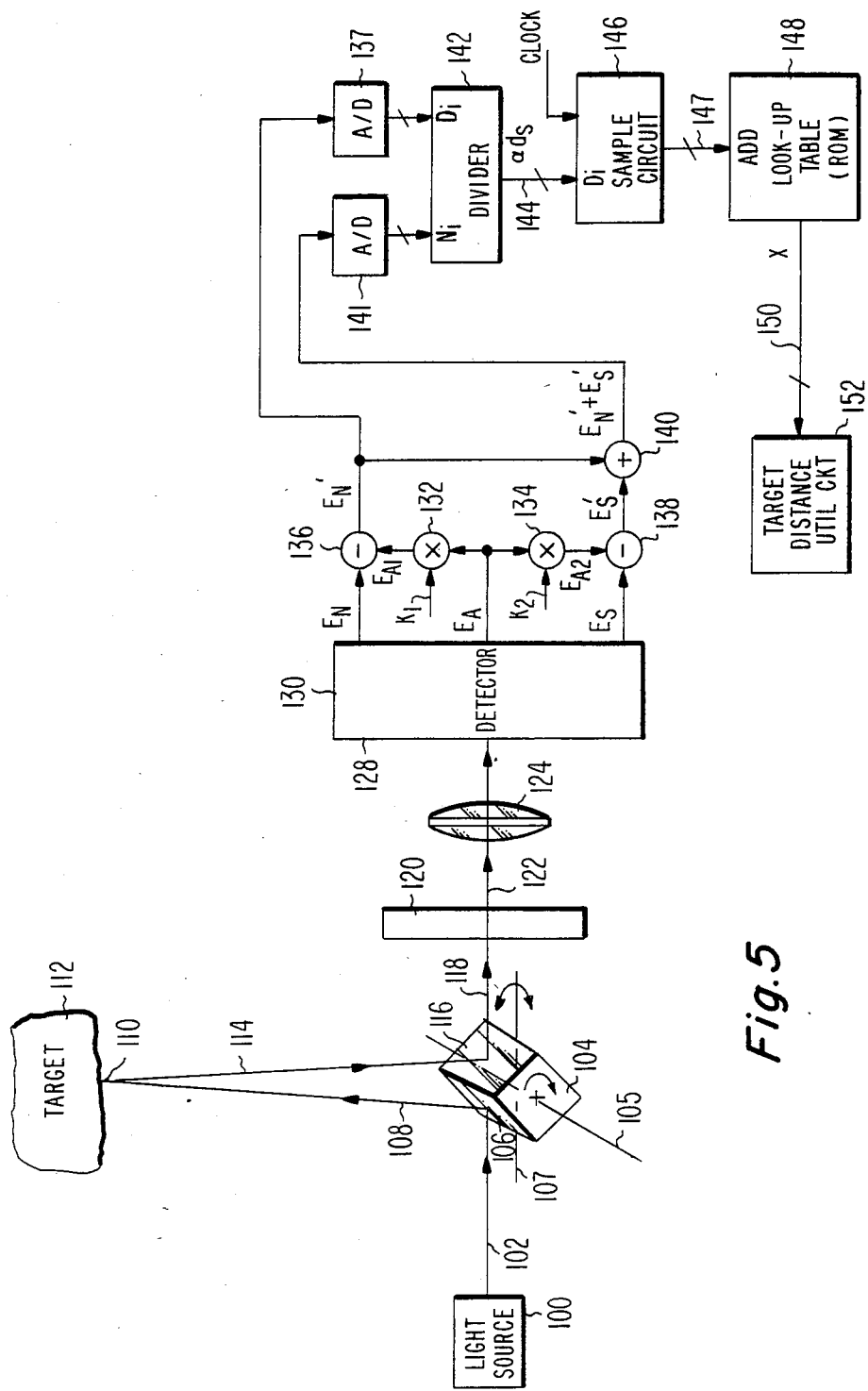
FIG. 5 illustrates a scanning optical target ranging system according to a second embodiment of the present invention.

Referring to FIG. 5, there is illustrated a scanning optical target ranging system embodying the novel features of the present invention. Light source 100 generates a beam of light represented by principal ray 102. Illustratively, light source 100 may be a laser which emits a narrow collimated beam of monochromatic light. Light beam 102 is reflected by mirrored surface 106 of prism 104, which rotates, as shown by the arrow, about an axis 105. The reflected beam 108 strikes target object 112 at a small point 110, where a certain amount of the light is reflected back as beam 114.

Reflected beam 114 impinges on mirrored surface 116 of rotating prism 104 where it is reflected as beam 118, substantially along the optical axis of lens 124. Light beam 118 is incident on light filter 120 which is selected to pass only light having wavelengths close to the wavelength of the source beam 102. Filtered beam 122 passes through convex lens 124 where it is imaged on light-receiving surface 128 of light detector 130. Light detector 130 may be of a type similar to detector 70 described in relation to FIGS. 3 and 4, and planar light-receiving surface 128 may have light-receiving areas of a type similar to narrow slit area 76, surrounding areas 78a and 78b, and remote, ambient light-receiving area 90, as shown in FIG. 4.

Referring again to FIG. 5, detector 130 provides three output electrical signals in response to the light striking surface 128. $E_N$ represents the light energy received in the narrow slit area, $E_S$ represents the total light energy received in the surrounding areas, and $E_A$ represents the ambient light energy received in the remote, ambient light-receiving area. Multiplying circuit 132 multiplies $E_A$ by $K_1$, a constant relating the sizes of the remote and narrow slit light-receiving areas, to obtain a first normalized value $E_{A1}$ of ambient light energy. Subtracting circuit 136 subtracts $E_{A1}$ from $E_N$ to obtain $E_N'$, the narrow slit area light energy corrected for the effect of ambient light. Similarly, multiplying circuit 134 multiplies $E_A$ by $K_2$, a constant relating the sizes of the remote and surrounding light-receiving areas, to obtain a second normalized value $E_{A2}$ of ambient light energy. Although shown symbolically as multiplication nodes, multiplying circuits 132 and 134 may be, for example, amplifiers for amplifying the electrical signal $E_A$ by gains of $K_1$ and $K_2$, respectively, to obtain $E_{A1}$ and $E_{A2}$, respectively. Subtracting circuit 138 subtracts $E_{A2}$ from $E_S$ to obtain $E_S'$, the surrounding area light energy corrected for the effect of ambient light. $E_S'$ and $E_N'$ are added by summing circuit 140 to provide output signal $(E_S'+E_N')$.

Analog sign $E_N'$ is coupled to an analog-to-digital (A/D) converter 137, where it is converted to a digital signal which is applied as one set of inputs to digital dividing circuit 142. Analog signal $(E_S'+E_N')$ is coupled to a second A/D converter 141, where it is converted to a digital signal which is applied as a second set of inputs to digital dividing circuit 142.

Divider 142 divides the value of the digital signal at its numerator ($N_i$) input terminals by the value of the digital signal at its denominator ($D_i$) input terminals to obtain a digital signal at its output terminals having value proportional to $d_s$, the diameter of the imaged blurred circle 42. The output signal on leads 144 is coupled to the data ($D_i$) input terminals of a sampling circuit 146, which may typically comprise a plurality of digital latches. The data at the $D_i$ input terminals are periodically sampled according to the frequency of the sampling clock applied to circuit 146.

The data signal on leads 147, representing the sampled value of the divider output signal, are applied to look-up table 148, which is illustratively a read-only memory (ROM) having a plurality of addressable storage locations. The storage locations are pre-programmed to contain data corresponding to a particular range of spot 110 on target object 112 for each value of the signal on leads 147 applied to its address (ADD) input terminals. Finally, the data signals on leads 150, containing information corresponding to the range, x, of target 112, are coupled to a target distance utilization circuit 152, which may, for example, be a motion-controlling processor of a robotic system.

In addition to the apparatus and method of ambient light detection discussed in relation to FIGS. 4 and 5, other means of performing this function may be implemented. As an example, light source 100 of FIG. 5 may be pulsed on and off, and during the on cycle, detector 130 measures light energy due to target illumination from source 100. During the off cycle, detector 130 measures the ambient light energy at virtually the same spot 110 on target 112. This scheme would render unnecessary a separate ambient light-receiving area 90 (see FIG. 4) as well as its associated light funneling means and photodetector.

As mentioned earlier, prism 104 rotates about axis 105 to supply virtually continuous information regarding the distance of target 112, as illuminated spot 110 scans across the surface of target 112, thereby providing a mapping function. Light source 100, prism 104 and lens 124 are aligned so as to direct reflected beam 118 along the optical axis of lens 124 as nearly as possible. Nevertheless, the finite diameter of prism 104 causes deviation from the collinearity between beam 118 and the optical axis. This results in an oscillatory movement of beam 118, 122 vertically along surface 128 of detector 130, similar to the shift of image position due to target range variations mentioned earlier. The effect of this oscillation can be negated by aligning narrow slit area 76 (FIG. 4) along the same vertical direction on surface 128 such that the image of spot 110 on surface 128 is always centered in narrow slit area 76.

A further dimension in the target range scanning function of the FIG. 5 system may be added by causing rotating prism mirror scanner to "nod" at a low frequency, i.e., mirror 104 rocks back and forth along axis 107 as shown by the two-headed arrow, normal to rotational axis 105. In this way a two-dimensional mapping of target 112 may be realized.

While the principles of the present invention have been demonstrated with particular regard to the illustrated structures of the figures, it will be recognized that various departures from such illustrative structures may be undertaken in the practice of the invention. As an example, it would be considered within the ordinary skill of one knowledgeable in the art to replace the tapered light pipes of FIG. 3 by bundles of light-transmitting optical fibers. The scope of this invention is not intended to be limited to the structures disclosed herein but should instead be gauged by the breadth of the claims which follow.

In the claims:

1. An apparatus for optical target ranging responsive to light radiation reflected from a target, said apparatus comprising:
    a light-sensitive detector having a planar light receiving surface, said light receiving surface including a narrow central light receiving area within two closely-spaced parallel boundaries;
    an optical system responsive to said light radiation for producing an unfocused generally circular image of said reflected light on said planar surface, said image illuminating a portion of said narrow central light receiving area;
    means for measuring the diameter of said unfocused image on said detector planar surface; and
    means coupled to said measuring means and responsive to said measured diameter for determining the range of said target.

2. The apparatus according to claim 1 wherein the distance between said two parallel boundaries is less than said diameter of said unfocused image.

3. The apparatus according to claim 2 wherein said detector is positioned so that the center of said unfocused image is located midway between said two parallel boundaries.

4. The apparatus according to claim 3 wherein said measuring means includes a divider responsive to the light energy received in said central area and to the total light energy received by said detector.

5. The apparatus according to claim 4 wherein said light receiving surface of said detector includes a remote area not illuminated by said light radiation reflected from said target, and wherein said measuring means is responsive to light received at said remote area.

6. The apparatus according to claim 1 wherein said means determining the range of said target includes computing means responsive to said measured diameter, to the distance between said planar surface of said detector and said optical system, and to inherent properties of said optical system.

7. The apparatus according to claim 1 wherein said means for determining the range of said target includes an addressable storage device, said storage device having a multiplicity of storage locations, which storage locations contain data such that when a storage location is accessed by an address corresponding to one of said measured diameters, the data content at said storage location so accessed corresponds to the range of said target.

8. The apparatus according to claim 1 further including source means for directing light radiation onto said target, said light radiation being directed substantially along the optical axis of said optical system.

9. An optical system for determining the range of a target, said system comprising:
    a source of light radiation;
    a light-sensitive detector having a planar light receiving surface, said light receiving surface including a narrow central light receiving area within two closely-spaced parallel boundaries;
    means for directing said light radiation so as to illuminate a spot on said target and for redirecting light radiation reflected from said illuminated spot onto said detector;
    said directing and redirecting means including an optical system responsive to said reflected light radiation for producing an unfocused generally circular image on said planar surface, said image illuminating a portion of said narrow central light receiving area;
    means for measuring the diameter of said unfocused image on said detector planar surface; and
    means coupled to said measuring means and responsive to said measured diameter for determining the range on said target.

10. The system according to claim 9 wherein the distance between said two parallel boundaries is less than said diameter of said unfocused image.

11. The system according to claim 10 wherein said detector is positioned so that the center of said unfocused image is located midway between said two parallel boundaries.

12. The system according to claim 11 wherein said measuring means includes a divider responsive to the light energy received in said central area and to the total light energy received by said detector.

13. The system according to claim 12 wherein said light receiving surface of said detector includes a remote area not illuminated by said light radiation reflected from said target, and wherein said measuring means is responsive to light received at said remote area.

14. The system according to claim 9 wherein said means for determining the range of said target includes computing means responsive to said measured diameter, to the distance between said planar surface of said detector and said optical system, and to inherent properties of said optical system.

15. The system according to claim 9 wherein said means for determining the range of said target includes an addressable storage device, said storage device having a multiplicity of storage locations, which storage locations contain data such that when a storage location is accessed by an address corresponding to one of said measured diameters, the data content at said storage location so accessed corresponds to the range of said target.

16. The system according to claim 9 wherein said source means is a laser which provides a collimated beam of monochromatic light.

17. The system according to claim 16 wherein said optical system includes an optical filter positioned to allow only light having substantially the wavelength of said monochromatic source means onto said planar light-receiving surface.

18. The system according to claim 9 wherein said directing and redirecting means include two mirrored facets of a prism.

19. The system according to claim 18 wherein said prism adapted to rotate about a central axis parallel to said two mirrored reflecting facets.

* * * * *

UNITED STATES PATENT AND TRADEMARK OFFICE
CERTIFICATE OF CORRECTION

PATENT NO. : 4,647,193

DATED : March 3, 1987

INVENTOR(S) : Jerome Peter Rosenfeld

It is certified that error appears in the above-identified patent and that said Letters Patent is hereby corrected as shown below:

Column 4, line 53, after "72," insert --to--.

Column 8, line 26, after "means" insert --for--.

Column 10, line 20, after "prism" insert --is--.

Signed and Sealed this

Eighteenth Day of August, 1987

Attest:

DONALD J. QUIGG

Attesting Officer     Commissioner of Patents and Trademarks